United States Patent [19]
Campbell

[11] 3,810,657
[45] May 14, 1974

[54] SHOULDER BELT POSITIONING ARRANGEMENT

[75] Inventor: David D. Campbell, Bloomfield Hills, Mich.

[73] Assignee: General Motors Corporation, Detroit, Mich.

[22] Filed: Mar. 9, 1973

[21] Appl. No.: 339,512

[52] U.S. Cl. .................................... 280/150 SB
[51] Int. Cl. .................................... B60r 21/02
[58] Field of Search ....... 280/150 SB; 297/387, 388, 297/389

[56] References Cited
UNITED STATES PATENTS

| | | | |
|---|---|---|---|
| 3,680,883 | 8/1972 | Keppel et al. | 280/150 SB |
| 3,551,002 | 12/1970 | Dozois | 280/150 SB |
| 3,418,021 | 12/1968 | Lewis | 297/388 |
| 2,257,099 | 9/1941 | Beirise | 280/150 SB X |

Primary Examiner—Leo Friaglia
Assistant Examiner—Randall A. Schrecengost
Attorney, Agent, or Firm—J. A. Kushman

[57] ABSTRACT

A positioning arrangement for the front seat shoulder belt of a two door type vehicle body in which the front seat back moves between a generally upright seating position and a forwardly tipped easy-enter position. The shoulder belt extends forwardly from an attachment to an outboard roof portion rearward of the front seat and has an intermediate portion slidably received by an aperture in the upper end of an elongated belt guide on an outboard upper portion of the front seat back. The belt guide is slidably mounted for movement between retracted and extended positions relative to this seat back and is reciprocated by a linkage between these positions in response to the seat back movement. When the seat back is moved to the forwardly tipped easy-enter position, the linkage moves the belt guide to the extended position so as to position the shoulder belt upwardly and to thus allow an occupant access to the vehicle rear seat without belt interference. Upon return movement of the seat back to the upright seating position, the linkage retracts the belt guide and moves the shoulder belt to a location where it can extend forwardly from the guide diagonally inboard across an occupant's chest in a restraining manner.

3 Claims, 4 Drawing Figures

PATENTED MAY 14 1974

3,810,657

SHOULDER BELT POSITIONING ARRANGEMENT

BACKGROUND OF THE INVENTION

This invention relates generally to restraint belt arrangements, and more particularly to a restraint belt arrangement for a two door type vehicle body with a front seat whose seat back tips between a generally upright seating position and a forwardly tipped easy-enter position to selectively allow a vehicle occupant access to a rear seat behind the front seat.

It is well known for a vehicle body to utilize a shoulder restraint belt for restraining an occupant in seated position on a seat within the occupant compartment of the vehicle. Shoulder restraint belts utilized with the front seats of current production vehicle bodies generally have an outboard end attached to the vehicle outboard roof structure and an inboard end selectively attachable to a short length of belt secured adjacent an inboard portion of this seat so as to position the shoulder belt in a position extending diagonally inboard across a front seat occupant's chest. It is likewise known for an intermediate portion of this type of shoulder belt to be slidably received by a belt guide mounted on the front seat back so as to thus position the shoulder belt in its occupant restraining position. When this type of seat back mounted guide is utilized with a two door type vehicle body whose seat back tips between a forward easy-enter position and a generally upright seating position, the access afforded to a person entering or leaving the rear seat with the front seat back tipped forwardly may be somewhat limited by the shoulder belt extending across the access space normally provided by this seat back movement.

SUMMARY OF THE INVENTION

This invention provides a shoulder belt positioning arrangement that allows a person to enter or leave the rear seat of a two door type vehicle body without interference with the front seat shoulder belt that extends between a roof attachment and a belt guide on the front seat back. This result is accomplished by providing the belt guide with an elongated configuration so as to be slidably movable between retracted and extended positions at an upper outboard portion of the seat back. An aperture on the upper end of the belt guide slidably receives the shoulder belt and a linkage shifts the belt guide between the retracted and extended positions in response to tipping movement of the seat back between its generally upright seating position and its forwardly tipped easy-enter position. As the front seat back is tipped forwardly, the linkage extends the belt guide and thus moves the shoulder belt upwardly to allow rear seat access without belt interference. During rearward movement of the seat back, the linkage retracts the belt guide so that the shoulder belt is positioned in a location adaptable to extend diagonally inboard across a front seat occupant's chest and to thereby restrain the occupant.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figure 1:
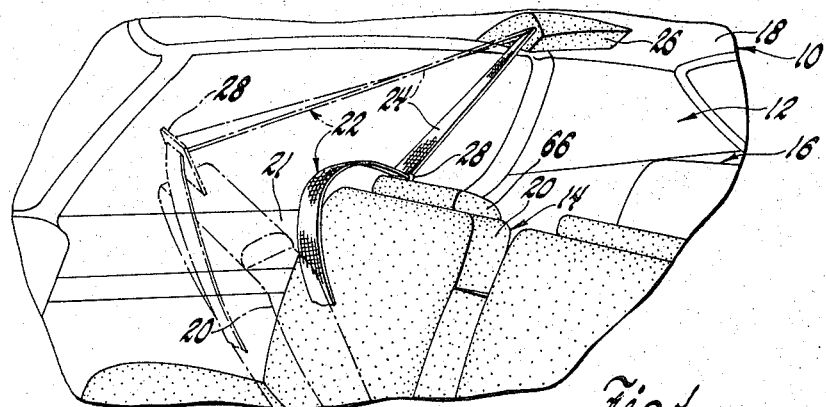
FIG. 1 is a perspective view showing the interior of a two door type vehicle body whose tipping front seat back includes a shoulder belt positioning arrangement according to this invention, with the seat back shown in a solid line indicated seating position where a belt guide of the positioning arrangement positions the shoulder belt for occupant use, and with the seat back shown in a forwardly tipped phantom line indicated easy-enter position where the belt guide positions the shoulder belt upwardly in an out-of-the-way position allowing occupant access to the rear seat without belt interference.

Reference should now be made to FIG. 1 of the drawings which discloses a vehicle body 10 whose occupant compartment is generally indicated by 12. Within the occupant compartment, a front seat 14 and a rear seat 16 are conventionally positioned below the vehicle roof 18 which defines the upper confines of the compartment. The vehicle body 10 is of a two door type and the front seat 14 thus includes a front seat back 20 that is movable between the solid line indicated generally upright seating position and the phantom line indicated forwardly tipped easy-enter position so as to allow a person access to the rear seat when entering the vehicle occupant compartment through a front door 21 located laterally adjacent the front seat 14.

A shoulder belt positioning arrangement, according to this invention, is generally indicated by 22, and includes a shoulder restraint belt 24 for use by a front seat occupant. The upper end of shoulder belt 24 is suitably attached to an outboard portion of the vehicle roof 18 rearward of front seat 14 by way of either a suitable retractor or a fixed attachment means covered by a suitable plastic housing 26. The shoulder belt 24 extends forwardly from housing 26 and is slidably received within an aperture in the upper end of an elongated shoulder belt guide indicated by 28. The belt guide 28 is slidably mounted for extending and retracting movement relative to the upper outboard portion of seat back 20, and is moved upwardly by a linkage in response to the forward tipping movement of this seat back to position shoulder belt 24 in an upper out-of-the-way position when the seat back is in its easy-enter position. This upward positioning of the shoulder belt 24 reduces the possibility that a person entering or leaving the rear seat 16 will be bothered by interferences with the shoulder belt. As the belt guide 28 moves forwardly with the seat back 20, the shoulder belt length between housing 26 and the belt guide 28 is increased and causes the shoulder belt 24 to slide through the belt guide to a certain extent. As the seat back 20 is moved rearwardly to its generally upright seating position, the linkage retracts the belt guide 28 back into the seat back and the shoulder belt slackens between the belt guide and housing 26. A seated occupant is then able to pull the shoulder belt forwardly back through the guide to eliminate this slack. The portion of the belt forward of the belt guide 28 is then positioned so as to extend diagonally inboard across an occupant's chest in a restraining position. The free or forward end of the shoulder belt carries a suitable attachment plate or buckle that is selectively attachable to a mating buckle or plate, respectively, so as to secure the shoulder belt in this restraining position.

Figures 2, 3, 4:
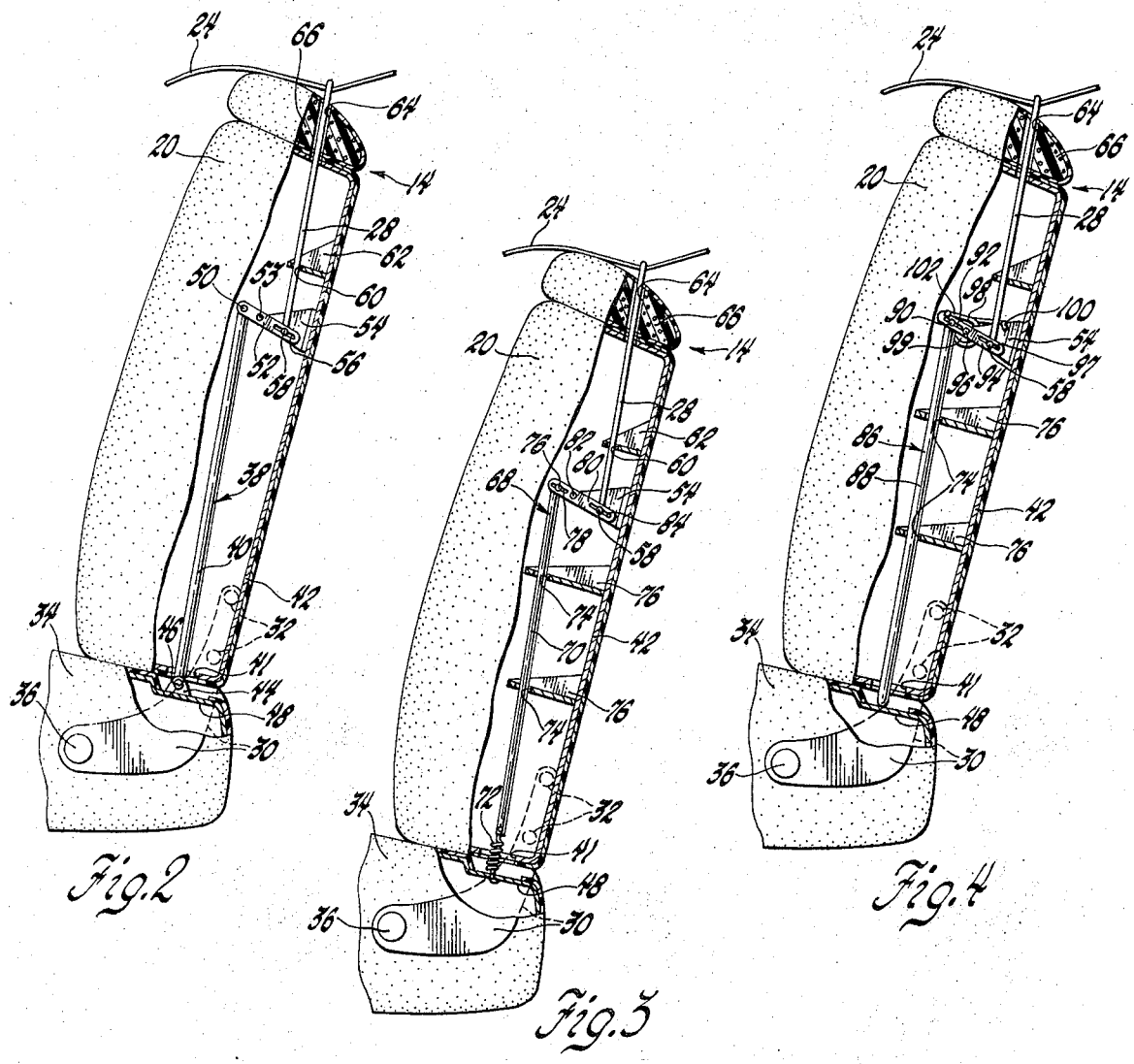
FIGS. 2 through 4 disclose various linkages for shifting the belt guide between its retracted and extended positions in response to seat back movement so that the shoulder belt is automatically moved between the positions shown in FIG. 1 as the seat back moves.

FIGS. 2 through 4 disclose various linkages for moving the belt guide 28 between its retracted and extended positions in response to seat back movement. As can be seen from these Figures, the front seat back 20 is attached to a pair of generally L-shaped brackets 30 at each of its sides by way of bolts or rivets 32. The lower forward ends of these brackets are pivotally supported on the seat cushion 34 of the seat by way of pintle bolts or pins 36 to thus support the seat for movement between its seating and easy-enter positions.

FIG. 2 discloses a linkage 38 for moving the belt guide 28 between its retracted and extended positions. This linkage includes an elongated rod 40 whose lower end extends downwardly through an aperture 41 in the framework 42 of seat back 20. This lower end of rod 40 is pivoted to a bracket 44 by way of a pin 46. A rearward portion of the seat cushion framework 48 supports the bracket 44 which is fixedly secured thereto in a suitable manner. The upper end of rod 40 is pivoted by a pin 50 to one end of a control link 52. An intermediate portion of the control link 52 is pivoted by way of a pin 53 to a bracket 54 suitably mounted on the seat back framework 42. The other end of control link 52 includes an elongated slot 56 which receives a pin 58 carried by the lower end of the shoulder belt guide 28. Above pin 58, the guide 28 is slidably received by an aperture 60 in a bracket 62 supported by the seat back framework 42, and is also received by an aperture 64 in the seat back framework and headrest 66 of the seat back 20.

As the seat back 20 is moved from its FIG. 2 seating position forwardly to its easy-enter position, the distance between pin 53 and pin 46 increases due to their relative positions with respect to the pintle pin 36 of the seat. This increase in distance causes the rod 40 to pivot control link 52 counterclockwise about pin 53 as the seat back moves forwardly and to thus shift the pin 58 and the belt guide 28 upwardly generally in the manner shown by FIG. 1. The pin 58 slides relative to the slot 56 in control link 52 as this upward movement of the belt guide proceeds and enables the belt guide to move in a rectilinear manner. During rearward movement of the seat back 20 to its seating position, the linkage 38 acts in a reverse manner to pivot control link 52 in a clockwise direction and to retract the shoulder belt guide 28 to its retracted position.

FIG. 3 discloses another linkage 68 for moving the belt guide 28 between its extended and retracted positions. Linkage 68 includes an elongated rod 70 whose lower end is suitably secured to the upper end of a helical spring 72. The lower end of spring 72 is suitably supported on the rearward portion 48 of the seat cushion framework, and the spring extends upwardly through the aperture 41 in the seat back framework 42 to the position where it is attached to rod 70. Intermediate portions of rod 70 are received by aligned apertures 74 in a pair of brackets 76 that are mounted on the seat back framework so that this rod slides in a rectilinear manner. The upper end of rod 70 supports a pin 76 slidable within a slot 78 in one end of a control link 80. A pin 82 pivots an intermediate portion of the control link 80 to the bracket 54 on the seat back framework 42, and the other end of this control link includes a slot 84 which slidably receives the pin 58 carried by the lower end of belt guide 28.

Linkage 68 functions much in the same manner as linkage 38 in order to move the belt guide 28 between its retracted and extended positions. As the seat back 20 is moved forwardly, the rod 70 slides downwardly in a rectilinear manner and rotates the control link 80 counterclockwise about pin 82 to shift belt guide 28 upwardly and position the shoulder belt out of the way of a rear seat occupant entering or leaving the vehicle body. During the rearward seat movement, the rod 70 shifts upwardly to pivot the control link 80 clockwise about pin 82 and shift the belt guide 28 downwardly. The spring 72 bends from its FIG. 3 position as the seat is moved forward to allow the rod 70 to move in this rectilinear manner relative to the brackets 76.

FIG. 4 discloses a linkage 86 for moving the belt guide 28 between its extended and retracted positions. This linkage 86 includes an elongated rod 88 whose lower end extends downwardly through the aperture 41 in the seat back framework 42 and abuts the rearward portion 48 of the seat cushion framework. Intermediate portions of rod 88 are also slidably received by aligned apertures 74 in a pair of brackets 76 mounted on the seat back framework 42 so as to support the rod for rectilinear sliding movement relative to seat back 20. The upper end of rod 88 carries a pin 90 slidably received within a slot 92 defined by one end of a control link 94. An intermediate portion of the control link 94 is pivoted by way of a pin 96 to the bracket 54 on the seat cushion framework. The other end of the control link defines a slot 97 receiving the pin 58 carried by the lower end of belt guide 28. A torsion spring 98 encircles a mounting portion 99 on the end of bracket 54, and has one arm 100 engaged with the bracket 54 and another arm 102 engaged with the end of control link 94 that defines slot 92. This torsion spring tends to bias the control link 94 in a counterclockwise direction about pin 96.

When the seat back shown in FIG. 4 is moved forwardly from its generally upright seating position, the distance between the rearward portion 48 of the seat cushion framework and the pin 96 increases and allows the torsion spring 98 to pivot the control link 94 counterclockwise as the lower end of rod 88 remains engaged with the seat cushion framework. After this forward tipping seat movement has proceeded to a certain extent, the lower end of rod 88 will move out of engagement with the seat cushion framework and the belt guide 28 will have been moved to its fully extended position under the impetus of spring 98 rotating control link 94 counterclockwise. As the seat back as shown in FIG. 4 moves rearwardly toward its seating position, the lower end of rod 88 will engage the rearward portion 48 of the seat cushion framework. This engagement will cause rod 88 to shift rectilinearly upwardly so as to act against spring 98 and to pivot control link 94 clockwise to retract the belt guide 28. During the rotational movement of the control link 94 in either of its directions, the pins 58 and 90 will slide relative to their respective slots in the control link to thus allow both the belt guide 28 and the rod 88 to move in a rectilinear manner.

While not shown by the drawings, it should be understood that a lap belt of the vehicle body is used with the shoulder belt 24 to fully restrain a front seat occupant.

It is believed evident from the foregoing description that this invention provides an improved shoulder belt positioning arrangement.

What is claimed is:

1. In a two door type vehicle body including a roof covering the occupant compartment thereof and having a front seat with a seat back movable between a generally upright seating position and a forwardly tipped easy-enter psition so as to selectively allow occupant access to a rear seat positioned behind the front seat, the combination comprising, a shoulder restraint belt for a front seat occupant with one end thereof attached to an outboard portion of the roof rearward of the front seat, an elongated belt guide slidably mounted on an upper portion of the seat back for movement between retracted and extended positions relative to the seat back, the belt guide having means adjacent the upper end thereof for slidably receiving an intermediate portion of the shoulder belt which extends forwardly therefrom for occupant use, and control means for moving the belt guide to the extended position in response to forward tipping movement of the seat back to the easy-enter position such that the shoulder belt is moved upwardly to allow occupant access to the rear seat without belt interference when the seat back is in this easy-enter position.

2. In a two door type vehicle body including a roof covering the occupant compartment thereof and having a front seat with a seat back movable between a generally upright seating position and a forwardly tipped easy-enter position so as to selectively allow occupant access to a rear seat positioned behind the front seat, the combination comprising, a shoulder restraint belt for a front seat occupant with one end thereof attached to an outboard portion of the roof rearward of the front seat, an elongated belt guide slidably mounted on an upper outboard portion of the seat back for movement between retracted and extended positions relative to the seat back, the belt guide defining an aperture adjacent the upper end thereof which slidably receives an intermediate portion of the shoulder belt such that the shoulder belt extends forwardly therefrom for occupant use, and control means for reciprocating the belt guide between the retracted and extended positions in response to movement of the front seat back between the seating and easy-enter positions such that the extended belt guide positions the shoulder belt upwardly to allow occupant access to the rear seat without belt interference when the seat back is in the easy-enter position and such that the retracted belt guide positions the shoulder belt in a position where this belt is adaptable to be used by a front seat occupant when the seat back is in seating position so that the belt extends diagonally inboard across the occupant's chest.

3. In a two door type vehicle body including a roof covering the occupant compartment thereof and having a front seat with a seat back movable between a generally upright seating position and a forwardly tipped easy-enter position so as to selectively allow occupant access to a rear seat positioned behind the front seat, the combination comprising, a shoulder restraint belt for a front seat occupant with one end thereof attached to an outboard portion of the roof rearward of the front seat, an elongated belt guide slidably mounted on an upper outboard portion of the seat back for movement between retracted and extended positions relative to the seat back, the upper end of the belt guide defining an aperture for slidably receiving an intermediate portion of the shoulder belt such that the shoulder belt extends forwardly therefrom for occupant use, and a control linkage attached to the belt guide and operatively associated with the front seat back so as to reciprocate the belt guide between the retracted and extended positions in response to movement of the front seat back between the seating and easy-enter positions such that the extended belt guide positions the shoulder belt upwardly to allow occupant access to the rear seat without belt interference when the seat back is in the easy-enter position and such that the retracted belt guide positions the shoulder belt in a position where this belt is adaptable to be used by a front seat occupant when the seat back is in seating position so that the belt extends diagonally inboard across the occupant's chest.

* * * * *